United States Patent
Wilmsen

[11] Patent Number: 5,975,972
[45] Date of Patent: Nov. 2, 1999

[54] VIBRATION DAMPER

[76] Inventor: Marco Wilmsen, Prinses Marijkestraat 28, NL-3251 XP, Stellendam, Netherlands

[21] Appl. No.: 09/000,122
[22] PCT Filed: Jul. 12, 1996
[86] PCT No.: PCT/NL96/00286
 § 371 Date: Feb. 18, 1998
 § 102(e) Date: Feb. 18, 1998
[87] PCT Pub. No.: WO97/04246
 PCT Pub. Date: Feb. 6, 1997

[30] Foreign Application Priority Data

Jul. 14, 1995 [NL] Netherlands ............................ 1000810

[51] Int. Cl.⁶ ..................................................... B63H 21/30
[52] U.S. Cl. ..................... 440/111; 248/562; 267/140.11; 267/140.13; 440/52
[58] Field of Search ............................... 440/52, 112, 111; 248/562, 566, 638, 634; 267/152, 140.11, 141.4, 140.3, 140.4, 140.13

[56] References Cited

U.S. PATENT DOCUMENTS 2,275,966  3/1942  Julien .
4,757,982  7/1988  Andra et al. .......................... 267/140.3
5,265,552  11/1993  Taylor .
5,284,315  2/1994  Hofmann et al. ........................ 248/562

FOREIGN PATENT DOCUMENTS 0416381  3/1991  European Pat. Off. .
0500432  8/1992  European Pat. Off. .
2 217 597  9/1974  France .
2 218 508  9/1974  France .
1 114 062  9/1961  Germany .
31 46 679  6/1983  Germany .
2 086 530  5/1982  United Kingdom .
WO 89/11416  11/1989  WIPO ................................... 440/111

Primary Examiner—Sherman Basinger
Attorney, Agent, or Firm—Young & Thompson

[57] ABSTRACT

The invention relates to a vibration damper having a housing formed by a shell part (1) and a base part (2), in which housing a pressure cavity (3) is located, which cavity at least partially is delimited by a membrane (4) of elastomer material. A pin (5) for transmitting vibrations to the membrane is fixed to the membrane and protrudes through the housing to the outside. The pin is fixed to the membrane by means of a plate (10) enclosed within the membrane, which plate (10) is dome-shaped and can be made of resilient material, such as spring steel. The membrane is attached to the shell part (1) by means of a type of adhesive joint at the location of the transition between the base (8) of the shell part and the side wall (9) of the shell part. The plate enclosed within the membrane can act as a leaf spring.

12 Claims, 2 Drawing Sheets

VIBRATION DAMPER

FIELD OF THE INVENTION

The present invention relates to a vibration damper comprising a housing formed by a shell part and a base part and having therein a pressure cavity which at least partially is delimited by a membrane of an elastomer material, such as rubber, arranged in the housing and extending between the side wall(s) of the shell part, and comprising a fixing pin for transmitting vibrations to be damped to the membrane, one end of the fixing pin protruding out of the housing via an opening made in the base of the shell part and the other end of the pin being fixed to the membrane by means of at least one plate which is enclosed within the membrane and roughly runs parallel to the base of the shell part.

BACKGROUND OF THE INVENTION

A vibration damper of this type is disclosed in German Offenlegungsschrift DE-A1 3 146 679. This publication describes an elastic engine support consisting of a housing formed by a shell part and a base part, the base part likewise being shell-shaped. A membrane is stretched in the housing by clamping said membrane between the shell part and the base part. This creates a pressure cavity between the membrane and the base part, by means of which pressure cavity air damping is created for vibrations transmitted to the membrane by means of the fixing pin. The membrane itself is made of rubber and likewise contributes to the vibration damping. The fixing pin is fixed to the membrane by means of a plate which is partially enclosed within the membrane and the function of which is exclusively to transmit forces exerted on the connecting pin to the membrane.

SUMMARY OF THE INVENTION

The aim of the present invention is to provide a vibration damper which has good vibration-damping characteristics, can be manufactured without great difficulty or high cost and is preferably very suitable for use in the suspension of ships' engines.

This aim is achieved with a vibration damper of the type mentioned at the outset, in that the membrane is fixed at the transition between the base of the shell part and the side wall(s) of the shell part by bonding to said side wall(s) and said base, in that the bonding of the membrane to the base extends towards the middle of the base over a distance such that the region of bonding to the base partially overlaps the region in which the at least one plate enclosed within the membrane extends.

The bonding of the membrane to the shell part can be realized relatively easily and the overlap between the bonding region and the plate enclosed within the membrane provides for relief of the bonded joint at that end thereof which faces towards the middle of the shell part. The bond between the membrane and the shell part is further relieved by applying a sufficiently high overpressure in the pressure cavity. Because the membrane is arranged at the base of the shell part, and as a result of the fixing of the membrane fixing pin by means of an enclosed plate, the movement of the vibration damper is limited to a short distance in one direction, that is to say the direction in which the fixing pin moves outwards from the housing. This small distance can be adjusted, optionally even to 0 mm, by adjusting the pressure in the pressure cavity in such a way that, in the assembled state, the membrane in the middle of the shell part is at a certain distance, corresponding to the stroke limit in said one direction, from the base of the shell part when in the rest position. The damping action in the case of a vibration damper of this type is, on the one hand, to be ascribed to the pressure cavity, which is preferably filled with air or another gas, and, on the other hand, to be ascribed to the elastic and/or damping characteristics of the membrane.

In this context the membrane is not understood to be a thin sheet-like element but is understood to be a relatively thick body having a thickness of from, for example, 0.5 cm up to a few cm.

When the membrane is made of rubber, the bond between the membrane and the shell part can, according to the invention, advantageously be produced by means of vulcanizing. The rubber is then vulcanized to the desired locations on the shell part on the inside of the shell part.

The bond between the membrane and the shell part can, however, also be obtained by means of a suitable adhesive joint. With many elastomer materials, the bond between the membrane and the shell part can also advantageously be produced by arranging for the elastomer material to adhere to the shell part while said material is in the plastic state.

To enable heavy blows on the vibration damper in the restricted direction to be better absorbed, without the shell part coming away from the base part, or the vibration damper as a whole coming away from, for example, a foundation, it is advantageous according to the invention if the at least one plate enclosed within the membrane is dome-shaped and if the concave side of said plate faces towards the base of the shell part. When the above-mentioned shock loads arise in the restricted direction, a dome shape of this type is able to absorb some of the shock force by permanent or non-permanent deformation of the dome section.

According to the invention, the damping and vibration characteristics of the vibration damper according to the invention can be further improved and, if desired, dimensioned to suit the operating conditions, if the enclosed plate is made of a resilient material, such as spring steel. The vibration characteristics of such a vibration damper are then determined by the vibration-isolating effect of the pressure cavity and the vibration-damping characteristics of the membrane and the enclosed plate. With this arrangement, the overall vibration and damping characteristics of the vibration damper can be sized by making choices with regard to the overpressure in the pressure cavity and the materials used for the enclosed plate and the membrane. In this context the at least one enclosed plate can be, for example, a leaf spring. It is also conceivable for a multiplicity of plates, which together form a leaf spring assembly, to be enclosed within the membrane.

In the case of the embodiment in which the enclosed plate or enclosed plates is/are made of a resilient material, it is particularly advantageous if the enclosed plate or enclosed plates is/are in addition dome-shaped with its (their) concave side(s) facing towards the base of the shell part.

In order to prevent or to reduce the force of severe shocks exerted on the base part in the case of overloading of the vibration damper in the direction of the base part it is advantageous, according to the invention, if that side of the membrane which faces towards the pressure cavity is provided with a shock buffer, which preferably is arranged within the extension of the fixing pin.

To enable the pressure in the pressure cavity to be adjusted to the conditions when fitting the vibration damper, it is advantageous according to the invention if a passage communicating with the pressure cavity is provided for letting down the pressure in the pressure cavity or for supplying a gas in order to raise the pressure in the pressure cavity. To this end, the fixing pin can advantageously be provided with a longitudinal bore, which communicates with the pressure cavity, for bringing the pressure cavity to the desired pressure.

According to a further advantageous embodiment, the base part is a flat plate. A flat plate of this type has dimensions which are such that the shell part is completely closed off. However, insofar as the base part extends beyond the shell part, the dimensions of such a base part can be arbitrary and can thus be matched to the fixing brackets of existing vibration dampers, which is beneficial for interchangeability with existing vibration dampers.

According to an advantageous embodiment, a bag impermeable to gas is arranged in the pressure cavity, which bag is or can be filled with a pressurized gas. The great advantage here is that the joint between the side wall(s) and the base part, as well as other joints, no longer have to be gas-tight. A fill valve protruding through the side wall can optionally be provided for filling the bag with a gas.

The present invention also relates to the use of a vibration damper according to the invention for the suspension and/or support of an internal combustion engine, in particular a ship's engine in a ship.

BRIEF DESCRIPTION OF THE DRAWINGS

The present invention will now be explained in more detail below with reference to the appended drawings, in which.

DETAILED DESCRIPTION OF THE INVENTION

Figure 1:
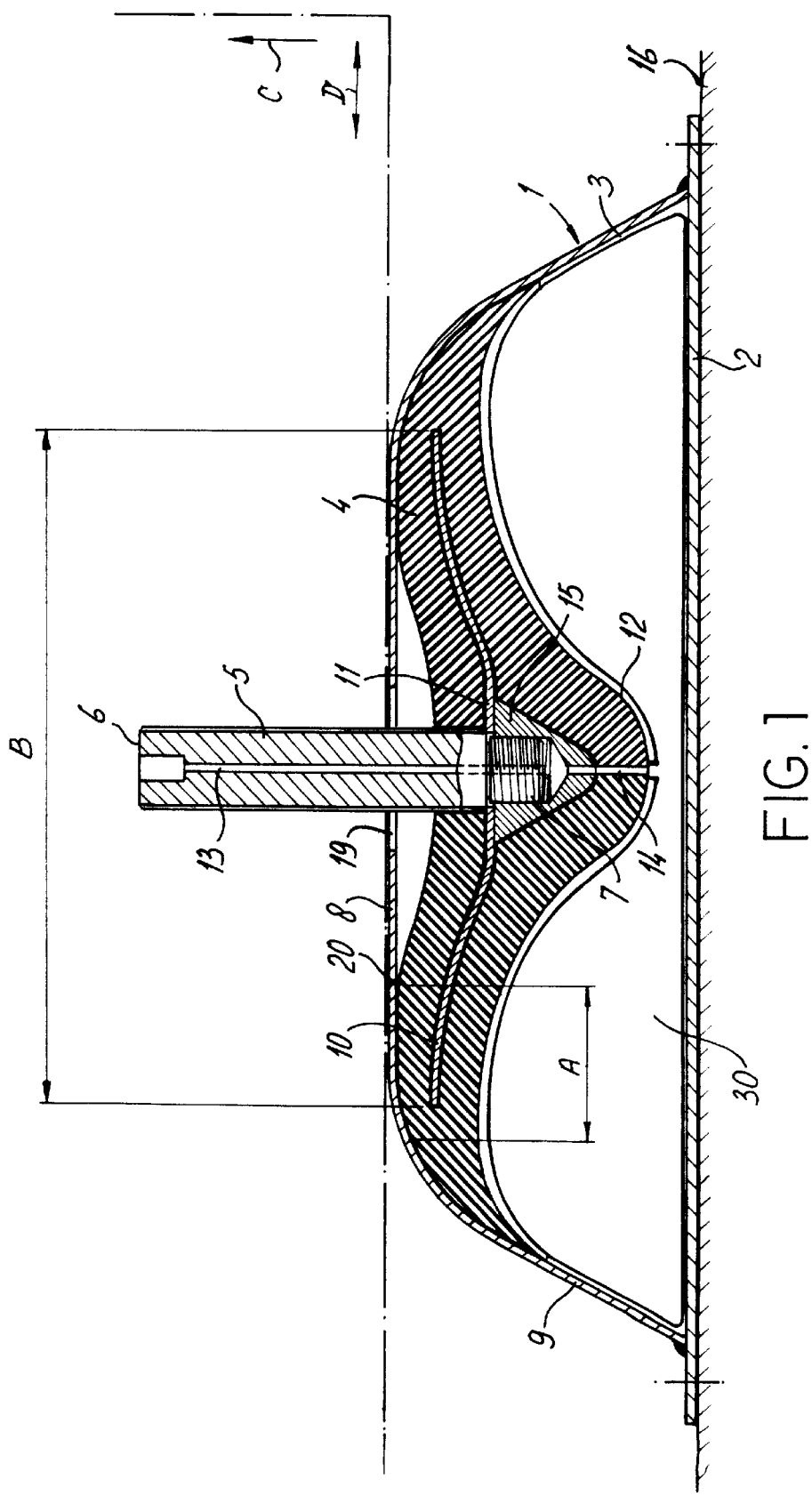
FIG. 1 is a first illustrative embodiment shown diagrammatically of the vibration damper of the present invention.

FIG. 1 shows an essentially circularly symmetrical vibration damper according to the invention, in cross-section. The vibration damper consists of a housing formed by a shell part 1 and a base part 2. In this embodiment the base part 2 is an essentially flat plate which is provided with fixing holes, indicated diagrammatically by centre lines, for fixing to a foundation 16 such as, for example, the hull of a ship.

The essentially circularly symmetrical shell part 1 consists of a peripheral side wall 9 and a base 8 located at the top. The shell part can optionally also consist of a multiplicity of adjoining wall sections and a base section.

A membrane 4 made of an elastomer material, preferably of rubber, such as, for example, natural rubber, is arranged in the housing. The membrane is affixed to the inside wall of the shell part at the transition between the base 8 of the shell part and the side wall 9 of the shell part. In the case of the rubber membrane 4, this bonding is produced by means of vulcanizing. Moreover, the bonding region where the membrane 4 is affixed to the shell part 1 extends over that section where the membrane 4 is in contact with the inside of the shell part 1, as is shown in the drawing.

The vibration damper is further provided with a fixing pin 5 which protrudes through an opening 19 in the base 8 of the shell part 1 and which can be fixed to, for example, an engine, the vibrations of which must be damped. The end 7 of the fixing pin 5 is screwed tight into a nut element 15 which is incorporated in the membrane 4 and, in turn, is connected to the plate 10. The plate 10 ensures that the forces exerted on the membrane 4 via the fixing pin are distributed over the membrane 4, so that the fixing pin 5 does not break out of the membrane. The essentially circularly symmetrical plate 10 extends over a region B which, as is indicated in the drawing, partially overlaps the region A of the bond between the membrane 4 and the base 8 of the shell part. The overlap of the regions A and B counteracts peak stresses at 20, which could lead to breaking of the bond between the membrane 4 and the shell part 1. Peak stresses in the region 20 are further counteracted by the high pressure in the pressure cavity 3, which, as it were, ensures that the membrane 4 is pressed against the base 8 of the shell part. Region A will preferably be at least half overlapped by region B. In the figure, region A is essentially virtually completely overlapped by region B. In this context the portion which is not overlapped can essentially be ascribed to the fact that the transition between the base section 8 and the side wall 9 is not accurately determined. It can be stated that in the figure the region where membrane 4 adheres to the base section 8 is completely overlapped by region B.

That side of the membrane 4 which faces the base part 2 is provided with a shock buffer 12. This shock buffer 12 ensures that in the case of high inwardly directed forces on the fixing pin 5 the force with which the membrane 4, or, if preferred, the fixing pin 5 or nut 15 impacts on the base part 2 is damped.

The fixing pin 5 is further provided with a longitudinal bore 13, which, via a bore 14 through the membrane 4, communicates with the pressure cavity 3. By this means it is possible to adjust the pressure in the pressure cavity 3 depending on the load conditions and thus to influence the vibration/damping characteristics.

A bag 30 is arranged in the pressure cavity 3. The bag 30 is filled with compressed air and is connected to duct 14 for filling. The bag 30 is airtight, which has the advantage that the side wall 9 does not have to be fixed in an airtight manner to base plate 2 and that the membrane 4 can optionally be porous.

In the vibration damper according to the invention, the function of the membrane 4 is, on the one hand, to provide a seal for the pressure cavity 3 and, on the other hand, to provide damping material for damping the vibrations.

In the vibration damper according to the invention, the plate 10 enclosed in the membrane 4 has a three-fold function, i.e.:

to limit the stroke of the damper in the upward direction C;

to increase the damping factor to complement the damping resistance of the pressure cavity and/or the membrane;

to increase the rigidity and stability of the construction with regard to forces acting on the pin 5 in the horizontal direction D.

By constructing the plate 10 from a resilient material, in particular spring steel, a fourth function is also added to the plate 10, namely the provision of a resilient effect. With this construction, the dome shape of plate 10, with the concave side 11 thereof facing towards the inside of the base 8 of the shell part 1, provides yet a fifth function to the plate 10. Specifically, said dome shape ensures that when the fixing pin 5 has been moved over its maximum stroke in the direction C, shock forces on the shell part 1 are reduced because the dome-shaped plate 10 is able to deform. This, in turn, ensures that the join by means of which the shell part 1 has been fixed to the base part 2, such as, for example, a weld or folded seam, is subjected to less stress under such circumstances. The same applies to the connection between the base part 2 and the substrate 16.

The spring constant of the vibration damper in the horizontal direction (that is to say in the direction of double-headed arrow D) is adjustable, on the one hand by varying the size of the overlap between the region A and the region B and on the other hand by varying the diameter of plate 10 and thus the size of region B. These two methods of adjustment can be used individually or in combination.

Figure 2:
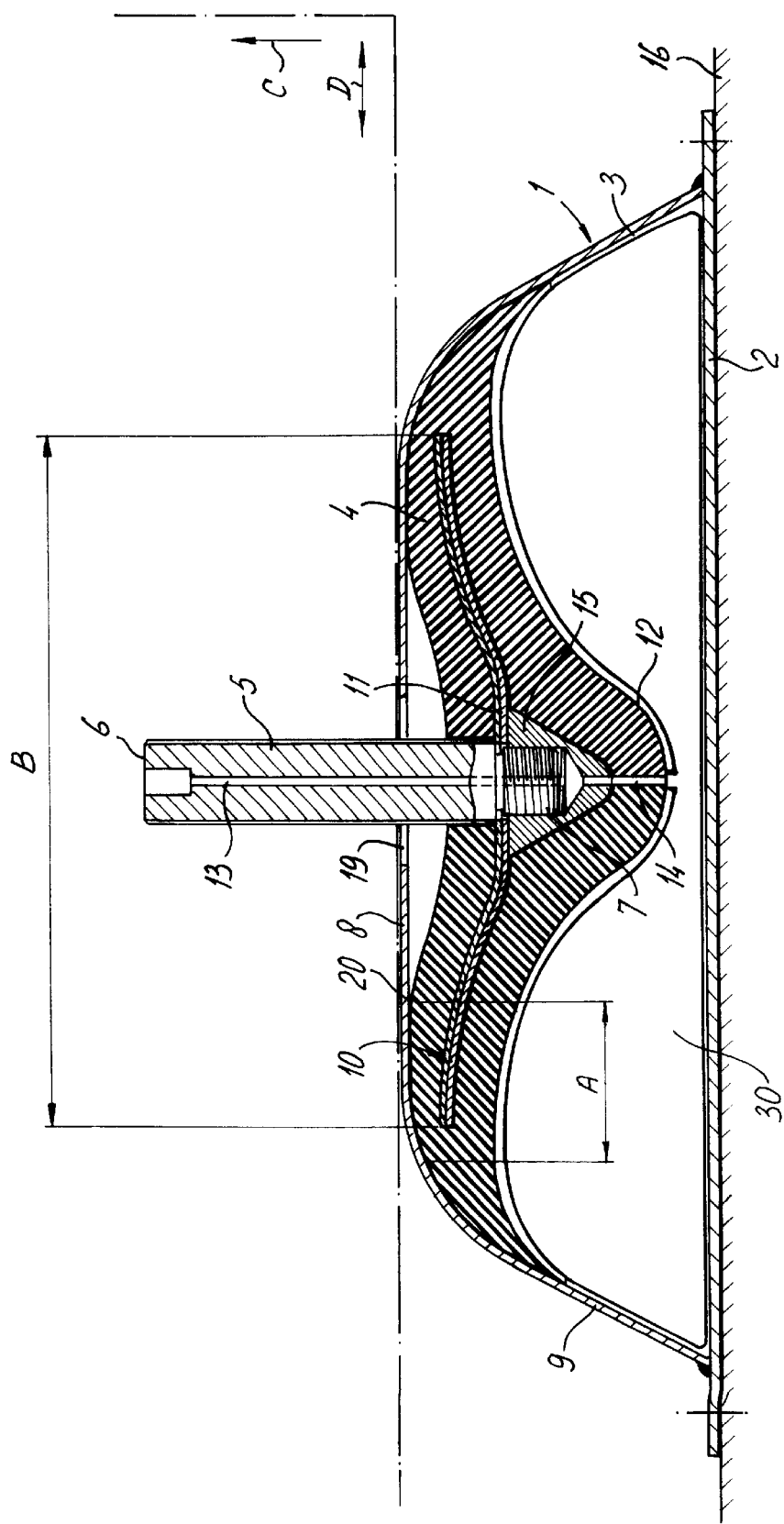
FIG. 2 depicts a second embodiment.

FIG. 2 depicts a second embodiment of the vibration damper of the present invention showing a multiplicity of plates 10 which together from a leaf spring assembly enclosed within the membrane 4.

Many variants of the vibration damper according to the invention are conceivable; for instance, the shape of the plate-shaped base part 2 can, for example, be arbitrarily matched to the shape of an existing recess for accommodating a conventional vibration damper.

I claim:

1. Vibration damper comprising a housing formed by a shell part (1) and a base part (2) and having therein a pressure cavity (3) which at least partially is delimited by a membrane (4) of an elastomer material arranged in the housing and extending from at least one side wall (9) of the shell part (1), and comprising a fixing pin (5) for transmitting vibrations to be damped to the membrane (4), one end (6) of the fixing pin (5) protruding out of the housing via an opening (19) made in a base (8) of the shell part (1) and the other end (7) of the pin being fixed to the membrane (4) and provided with at least one plate (10) roughly running parallel to the base (8) of the shell part (1), in which the membrane (4) extends over the base (8) of the shell part (1), and is fixed at a transition between the base (8) of the shell part (1) and said at least side wall (9) of the shell part (1) by bonding to said side wall (9) and said base (8), wherein the pin is fixed to the membrane by means of said at least one plate (10) which is enclosed within the membrane (4), and the bonding of the membrane (4) to the base (8) extends towards the middle (at 19) of the base (8) over a distance such that the region of bonding (A) to the base (8) partially overlaps the region (B) in which the at least one plate (10) enclosed within the membrane (4) extends.

2. Vibration damper according to claim 1, wherein the membrane is made of rubber and the bond to the shell part has been produced by vulcanizing.

3. Vibration damper according to claim 1, wherein the bond between the membrane and the shell part has been produced by arranging for the elastomer material to adhere to the shell part while said material is in the plastic state.

4. Vibration damper according to claim 1, wherein said at least one plate enclosed within the membrane is dome-shaped with its concave side facing the base of the shell part.

5. Vibration damper according to claim 1, wherein said at least one plate enclosed within the membrane is made of a resilient material.

6. Vibration damper according to claim 1, wherein said at least one plate is a leaf spring.

7. Vibration damper according to claim 6, wherein a multiplicity of plates, which together form a leaf spring assembly, are enclosed within the membrane.

8. Vibration damper according to claim 1, wherein a side of the membrane which faces towards the pressure cavity is provided with a shock buffer arranged in extension of the fixing pin.

9. Vibration damper according to claim 1, wherein the fixing pin is provided with a longitudinal bore, which communicates with the pressure cavity, for bringing the pressure cavity to a desired pressure.

10. Vibration damper according to claim 1, wherein the base part is a flat plate.

11. Vibration damper according to claim 1, wherein a bag fillable with a compressed gas is arranged in the pressure cavity, said bag being impermeable to gas.

12. Method of damping vibrations in a ship having an internal combustion engine, which comprises supporting the internal combustion engine with a vibration damper according to claim 1.

\* \* \* \* \*